Nov. 14, 1967 H. TEICHMANN 3,352,172
PLANETARY GEARING WITH A MOVABLE PLANETARY CARRIER
Filed Nov. 4, 1965 4 Sheets-Sheet 1

INVENTOR

Heinrich Teichmann

BY Bailey, Stephens and Huettig
ATTORNEYS

INVENTOR
Heinrich Teichmann

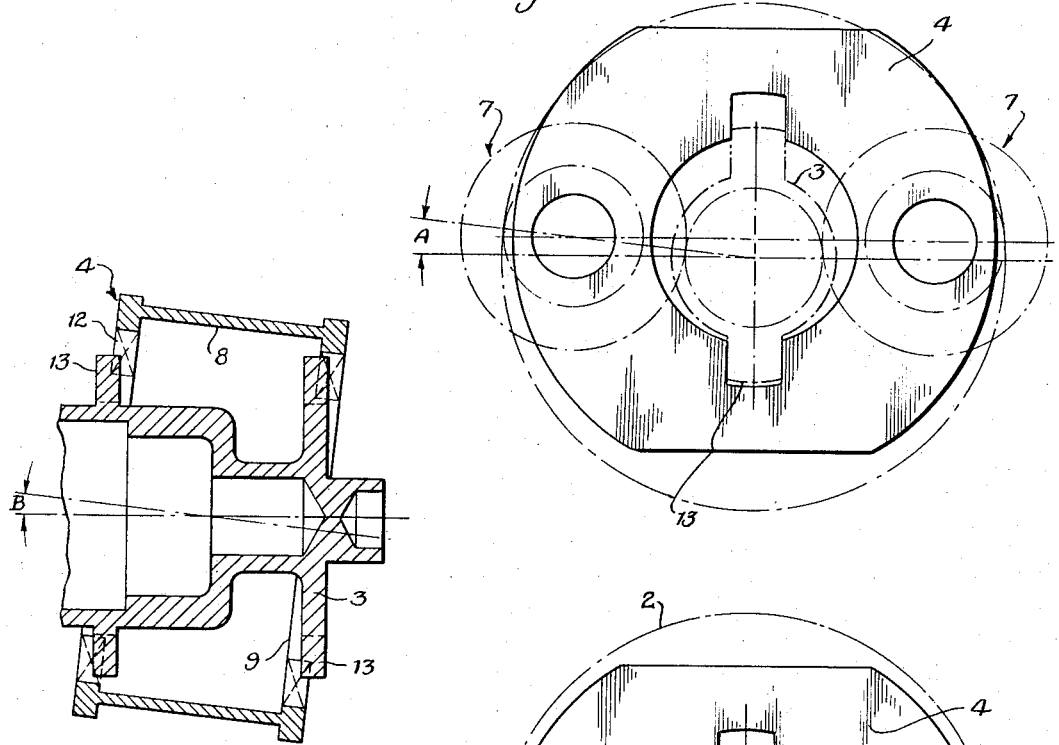
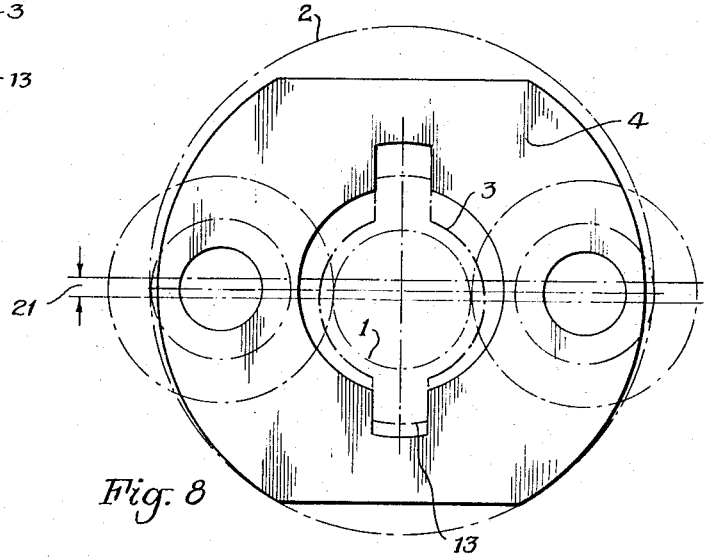

United States Patent Office 3,352,172
Patented Nov. 14, 1967

3,352,172
PLANETARY GEARING WITH A MOVABLE
PLANETARY CARRIER
Heinrich Teichmann, Geiselbullach, Germany, assignor to
M.A.N. Turbo GmbH., Munich, Germany
Filed Nov. 4, 1965, Ser. No. 506,369
Claims priority, application Germany, Nov. 6, 1964,
B 79,230
4 Claims. (Cl. 74—410)

ABSTRACT OF THE DISCLOSURE

In a planetary gear, the secondary gears are carried on a frame which is movable with respect to a first plane lying on the axes of the secondary gears and also movable with respect to a second plane extending at a right angle to said first plane and parallel to said axis. This achieves an even distribution of tooth pressure so that the load is evenly distributed on the individual gears and the tolerances in the gears are equalized.

---

This invention relates to gears and to a gear system essentially composed of a drive gear, a driven gear, and intermediate gears between the drive gear and driven gear carried on a stationary frame.

Various methods have been used to achieve an even distribution or equalization of tooth pressure in a planetary gearing so that the load is uniformly distributed on the individual gears and the tolerances in the gears are equalized. Couplings which are adjustable under loaded conditions between the various gears, cardan type suspension of the sun gear, and so forth have been used in an effort to adjust the balance or stability of the pressures on the gear wheels when the gears are transmitting a rotary movement or torque. This is in order to relieve as much as possible of the load on the bearings of the drive gear and ring gear from the force of the intermediate planetary gears. Such techniques as used for planetary gearing with rotating planetary gears and/or with a known stationary carrier, for the intermediate gears require costly construction with a resulting increase in the cost of the gears.

The object of this invention is to produce a gear transmission system having a stationary carrier frame for the secondary intermediate gears which can be inexpensively constructed and which will produce an automatic adjustment of the gears in accordance with the load. In this invention, the carrier for the secondary intermediate gears is positioned for movement with respect to a first plane lying on the axes of a pair of secondary gears and also for movement with respect to a second plane extending at a right angle to said first plane and parallel to said axes. The stationary frame is thus movable enough for adjustment of the load on the gears.

By means of this invention, the entire gear system can be more simple and economical than heretofore because an automatic adjustment of the intermediate secondary gears in operation is obtained inasmuch as the carrying frame can be tilted and displaced both longitudinally and transversely. Because of this automatic adjustment of the secondary gear wheels, the tolerances heretofore required to compensate for errors in gear rotation, distance between the gear axes, deviation from center of the bearings position, thickness and position of teeth, and in particular, when using a compound secondary gearing with two rows of teeth, do not have to be as great as heretofore. This means that the finished gears of this invention can be more simply and inexpensively produced.

Another feature of this invention is in that, while the gears are being accelerated, the secondary gear carrier frame adjusts automatically to a particular position which is maintained during the entire running inasmuch as the frame holding means according to this invention reduces friction vibrations in corresponding grooves. Also, the automatic adjustment of the secondary gear wheel carrier frame eases the load on the driving gear bearings and the secondary ring gear drive shaft by reducing the tooth forces. The bearings are thus essentially guide bearings and can be made of less size.

The means by which the objects of the invention are obtained are described more fully with respect to the accompanying drawings in which:

FIGURE 7 is a schematic view of one position of adjustment of the intermediate gear frame;

FIGURE 8 is a similar view of a second adjustment of the frame; and

FIGURE 9 is a cross-sectional view through the gear frame showing a third adjustment of the frame.

Figure 1:
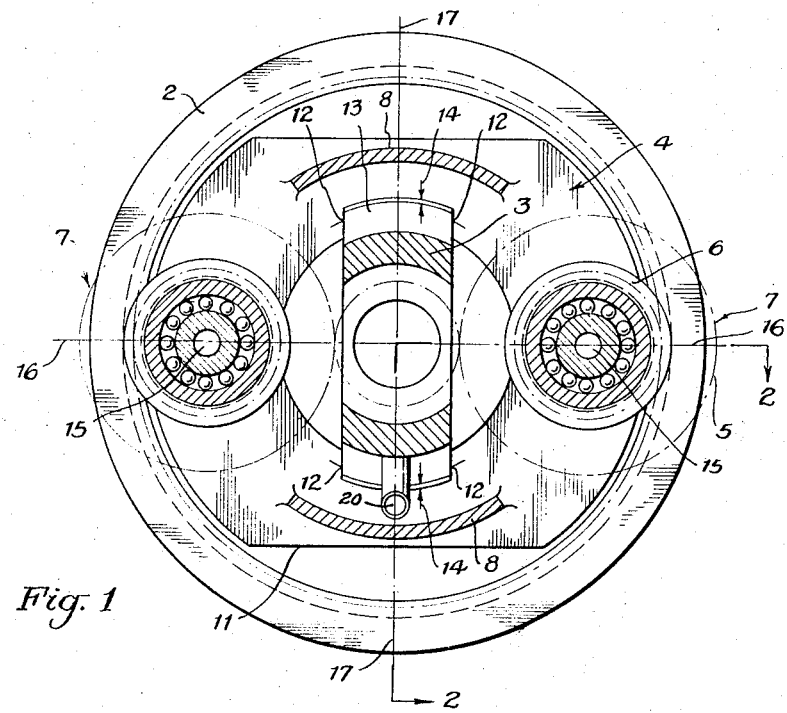
FIGURE 1 is a cross-sectional view through the transmission gear system of this invention.
Figure 2:
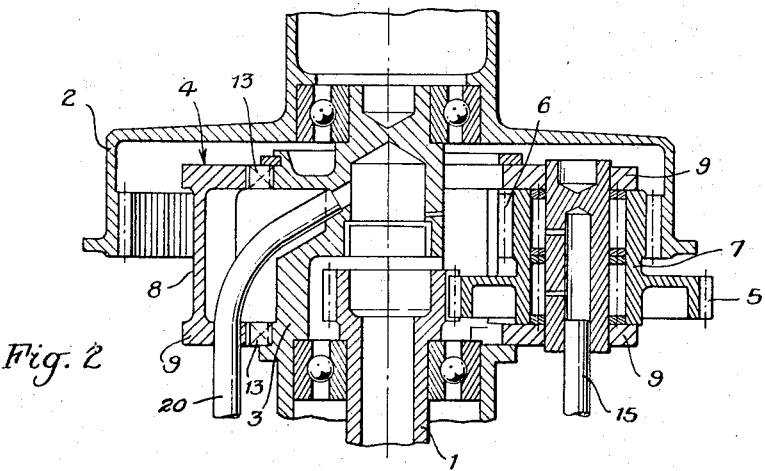
FIGURE 2 is a cross-sectional view taken on the line 2—2 of FIGURE 1.
Figure 3:
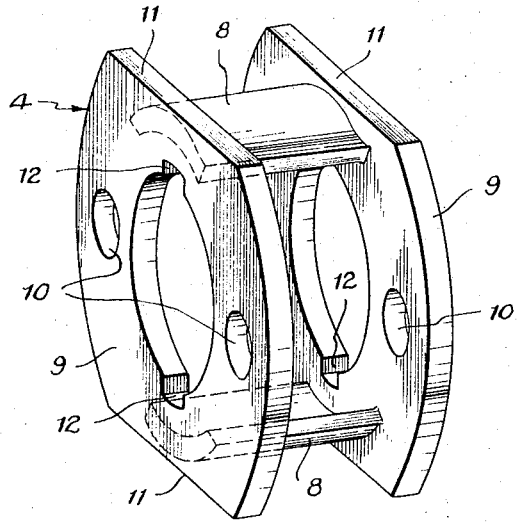
FIGURE 3 is a perspective view of the carrier frame for the intermediate secondary gears of FIGURES 1 and 2.

As shown in FIGURES 1 and 2, the center drive gear 1 and driven ring gear 2 are carried on a stationary portion or mounting 3. The intermediate secondary gear carrier frame 4 is also mounted on the stationary portion 3 and said frame carries three secondary gears 5 and 6 of different diameters which are joined into a single double gear 7. Gear 5 engages with gear 1 and gear 6 engages with outer ring gear 2. As shown in FIGURE 3, the frame 4 for the gears 7 is composed of struts 8 which join a pair of spaced parallel annular plates 9. In order to reduce their weight, these plates have flattened opposite edges 11. To achieve the automatic adjustment feature of this invention which allows the displacement of the secondary gear 7, the inner walls of the aligned openings through the plates 9 are provided with pairs of grooves 12 diametrically disposed. These grooves loosely engage studs 13 joined to the stationary mounting 3. This loose engagement produces radial and axial movement through the space 14 between the outer ends of the studs and the bottoms of the grooves 12. The grooves 12 and studs 13 are so positioned with respect to the secondary gear 7 that the frame 4 extends in a plane 16 going through the axes 15 of the secondary gear 7 and also lies in a plane 17 extending at a right angle to the plane 16 and parallel to the axes 15, thus permitting movement within the space 14; note FIGURES 7 to 9. Lubricating oil is supplied to the gearing through pipe 20.

Figure 6:
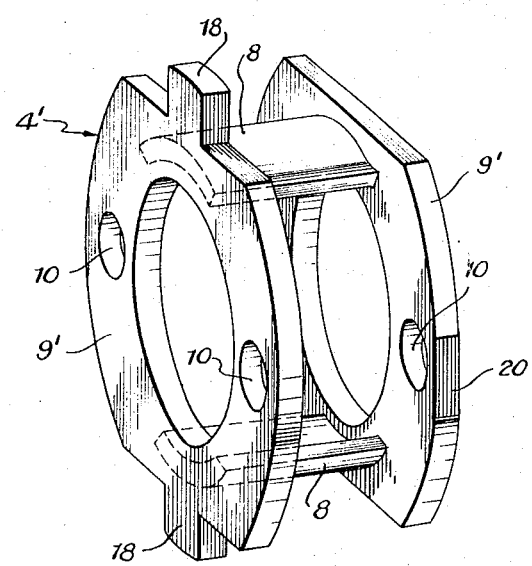
FIGURE 6 is a perspective view of the intermediate secondary gear frame of FIGURES 4 and 5.
Figure 4:
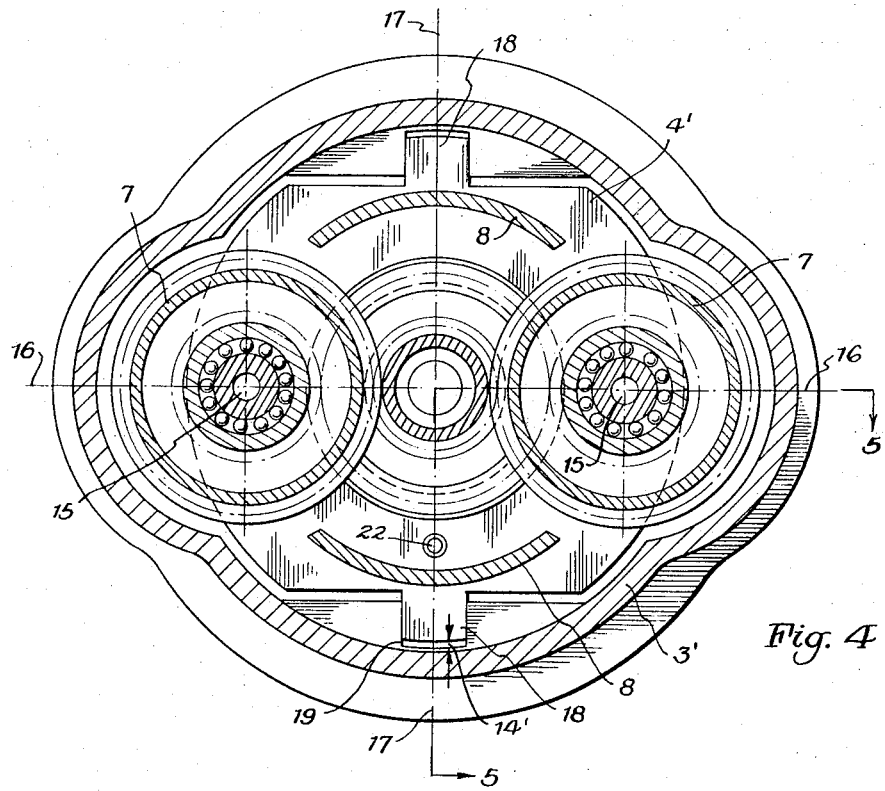
FIGURE 4 is a view similar to FIGURE 1 of a modified form of the invention.
Figure 5:
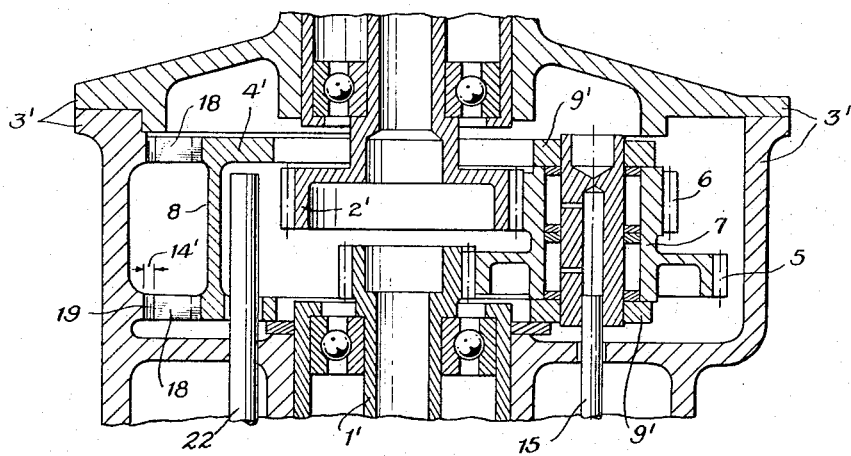
FIGURE 5 is a cross-sectional view taken on the line 5—5 of FIGURE 4.

In the modification of FIGURES 4, 5 and 6 are also the drive gear 1' and the ring gear 2' which are supported on the stationary portion 3'. The stationary frame 4' for the secondary gear 7 which engages gears 1' and 2' also holds the doubled gears 5 and 6. Gear 5 engages gear 1' while gear 6 engages ring gear 2'. Frame 4' is composed as in FIGURE 3 of two annular plates 9' which are rigidly joined by struts 8. Each plate has bores 10 for receiving the shafts of the secondary gears 7.

In contrast to the frame 4 of FIGURES 1 to 3, in FIGURES 4 and 5, studs 18 are mounted on the outer circumference on diametrically opposed sides of at least one of the plates 9'. These studs loosely engage in the corresponding grooves 19 in the stationary portion 3' so that a clearance 14' is produced for permitting movement of the frame 4'. Thus again frame 4' can adjust itself in the plane 17 defined in FIGURE 1. Pipe 22 is for the supply of lubricating oil.

As shown in the modification of FIGURE 6, the frame 4' has a pair of studs 18 diametrically mounted on only one of the plates 9' while at the same time, flat guide surfaces 20 are provided on the outer side edges of the other plate 9'. In this manner, the frame is held while permitting relative movement both by the studs 18 engaging in corresponding grooves as well as by the guide surfaces 20 which bear against corresponding guide surfaces on the stationary portion 3'.

Guide surfaces 20 extend parallel to the plane 17 for movement of the frame 4' in order to ensure that the frame can have its required swing or displacement.

It is apparent that the frame construction of FIGURE 6 can be adapted for use in the gear system of FIGURES 1 to 3.

In FIGURE 7, it is shown that the intermediate secondary gears 7 carried on frame 4 can be displaced or moved by the force of the gear teeth through the angle A or, in other words, frame 4 is displaced through that angle.

In FIGURE 8, it is shown that frame 4 can be displaced by a distance 21 between the drive gear 1 and the ring gear 2. Thus the frame 4 carrying the secondary gears adjusts itself automatically as, for example, in the center of the axial displacement.

FIGURE 9 represents a section lying in the plane 17 and through frame 4 and showing displacement of this frame relative to the stationary portion 3. The frame is swung through an angle B in order to equalize or stabilize errors due to the direction and rotation of the gears.

Having now described the means by which the objects of the invention are obtained, I claim:

1. In a transmission gear system having a drive gear, a driven gear, and a pair of secondary gears intermediate the drive gear and driven gear, the improvement comprising a frame carrying said secondary gears on radially opposite sides of said drive gear, and said frame being mounted for movement with respect to a first plane lying on the axes of said pair of secondary gears and also for movement with respect to a second plane extending at a right angle to said first plane and parallel to said axes.

2. In a system as in claim 1, said frame comprising two parallel annular plates connected by struts, a pair of studs outwardly extending from opposite sides of at least one of said plates, a stationary mounting supporting said gear system, and stationary groove means in said mounting for loosely holding each of said studs, respectively, for permitting movement of said frame.

3. In a system as in claim 1, said frame comprising two parallel annular plates having centrally aligned openings and connected by struts, a pair of oppositely extending grooves in the wall of each opening, a stationary mounting supporting said gear system, and stationary stud means in said mounting and in said grooves for allowing movement of said frame.

4. In a system as in claim 1, said frame comprising two parallel annular plates connected by struts, a pair of studs outwardly extending from opposite sides of one of said plates, a stationary mounting supporting said gear system, stationary groove means in said mounting for loosely holding each of said studs, respectively, and flat guide surface means on the outer edge of the other of said plates, said guide means extending parallel to said second plane.

References Cited

UNITED STATES PATENTS

| | | | |
|---|---|---|---|
| 1,038,047 | 9/1912 | Wetherbee | 74—410 X |
| 3,011,365 | 12/1961 | Stoeckicht | 74—410 X |
| 3,244,020 | 4/1966 | Breuer | 74—410 X |

DONLEY J. STOCKING, *Primary Examiner.*

L. H. GERIN, *Assistant Examiner.*